Patented May 26, 1931

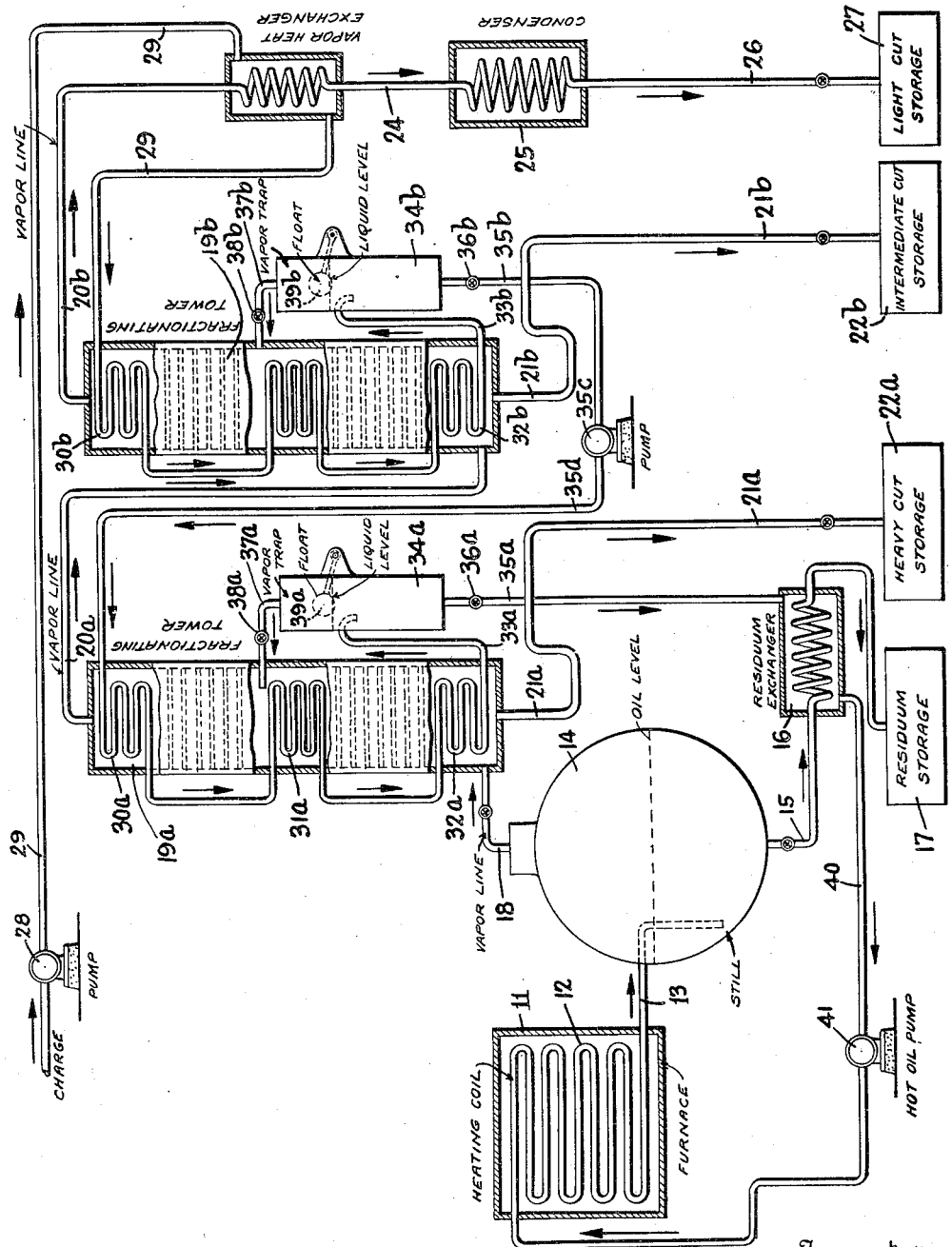

1,806,732

UNITED STATES PATENT OFFICE

OTTO BEHIMER, OF CHICAGO, ILLINOIS, ASSIGNOR TO THE TEXAS COMPANY, OF NEW YORK, N. Y., A CORPORATION OF DELAWARE

PROCESS OF DISTILLATION

Application filed February 10, 1928. Serial No. 253,256.

This invention relates to the art of distillation and has particular reference to the fractional distillation of hydrocarbon oil.

Broadly and generally the invention contemplates bringing fresh charging stock on its way to a still in heat exchange but not direct contact or equilibrium with vapors evolved from the still and separating out evolved vapors from the charge thus heated before it is admitted to the still. In accordance with my invention the charging stock is passed through a conduit in heat exchange with vapors from the still and at predetermined points in the conduit evolved vapors from the charging stock are separated out and removed while the remaining liquid portion of the charge is passed into the still.

The invention contemplates a continuous process of distillation in which hydrocarbon oil is charged to a still wherein distillation takes place, the oil charge heated by exchange of heat from the vapors evolved from the still, but not in direct contact therewith, to such an extent that a portion is vaporized, the vaporized portion separated and combined with all or a portion of the vapors from the still and the unvaporized portion of the charge introduced into the still.

The invention may be readily understood from a description of the procedure of the process considered in connection with the accompanying drawing which represents in diagrammatic sectional elevation an apparatus which may be employed for carrying on the process. The apparatus illustrated in the drawing is shown and described merely for the purpose of aiding in understanding the process and it is to be understood that any other suitable apparatus may be substituted for that shown.

Referring to the drawing, there is provided a furnace 11 surrounding a heating coil 12 which is connected to the still 14 through the line 13. The still 14 may or may not be heated by a suitable furnace (not shown) and if desired the heating coil 12 may be omitted. The still is provided with a connection at 15 for withdrawing the contents of the still through an exchanger 16 to a suitable storage tank 17. From the vapor portion of the still 14 a vapor line 18 connects with the lower portion of a fractionating tower 19a provided with a vapor line 20a at the top, and a line 21a at the bottom for the withdrawal of condensate therefrom. The line 21a is connected to a suitable storage receptacle 22a.

From the top of the fractionating tower 19a the vapor line 20a is connected to the lower portion of a fractionating tower 19b which, in its general construction, may be a substantial counterpart of the tower 19a. A line 21b is provided for withdrawing condensate from the lower portion of the tower 19b and leads to a suitable storage receptacle 22b. From the top of the tower 19b a vapor line 20b is connected to a vapor heat exchanger 23 which is in turn connected by the line 24 to a suitable condenser 25. A line 26 leads from the condenser to a storage receptacle 27. Although, in the apparatus illustrated in the drawing, two fractionating towers are shown, it will be understood that one tower or several may be used, depending upon the number of fractions into which it is desired to separate the oil charge.

By means of the pump 28 the oil charge is forced from a source (not shown) through the charging line 29 connected with the vapor heat exchanger 23. A continuation of the charging line 29 leads from the vapor heat exchanger 23 through a series of connected coils 30b, 31b, and 32b, located within the tower 19b, which in turn connect with the line 33b leading to the vapor trap 34b. The vapor trap 34b consists of a drum to which is connected, at the lower end, a liquid draw-off line 35b fitted with a valve 36b and at the upper end, a vapor outlet line 37b fitted with the valve 38b, the line 37b entering the fractionating tower 19a at an intermediate point.

A float 39b is provided to regulate the level maintained in the vapor trap 34b, acting through suitable means (not shown) to operate the valves 36b and 38b.

The line 35b extends to a pump 35c which has a discharge line 35d leading to the coils 30a, 31a, and 32a, located in the tower 19a in a manner similar to the location of the coils 30b, 31b, and 32b, in the tower 19b. The series of coils is connected, through the line 33a, with the vapor trap 34a. As pointed out in the previous paragraph, the tower 19a is a substantial counterpart of the tower 19b and the same applies to the corresponding coils, connections, vapor trap, etc. From the lower portion of the vapor trap 34a the line 35a leads to the residuum exchanger 16 and after passing therethrough connects by means of the line 40 to the hot-oil pump 41. The vapor line 37a leads from the upper portion of the vapor trap 34a, entering the tower 19a at an intermediate point.

The operation of the process in connection with the apparatus shown may be as follows:

The oil charge, which for the purpose of the present description may be considered as a mid continent crude petroleum, enters the distillation system or unit through the pump 28 which forces the oil through the charging line 29 and the vapor heat exchanger 23. The oil charge flows to the still from the vapor heat exchanger 23, by way of the continuation of the line 29, and the coils 30b, 31b, and 32b, into the vapor trap 34b. From the lower portion of the vapor trap 34b the charge flows through the line 35b, to the pump 35c which charges the oil through the line 35d to the coils 30a, 31a, and 32a, to the vapor trap 34a and from the lower portion thereof through the line 35a, through the residuum exchanger 16 and the line 40 to the hot-oil pump 41, which forces the charge through the heating coil 12 and the line 13 into the still 14. Although a series of three coils is in each fractionating tower, it will be understood that any desired arrangement of coils may be made whereby the charge is heated by exchange of heat from the vapors evolved from the still. Thus for example the coils 31b, 32b, 31a and 32a may be omitted and the cooling to the fractionating columns 19a and 19b supplied by the coils 30b and 30a in the upper part of the columns. When a plurality of separated coils, such as 30a, 31a, and 32a are employed in a fractionating tower vapor traps may, if desired, be disposed between the several coils.

Heat is applied to the charge while passing through the heating coil 12, the temperature to which the charge is raised ordinarily being sufficient to provide for the most of the distillation required to take place in the still. If desired, additional heat for distillation may be applied to the still from a suitable furnace not illustrated in the drawing. A portion of the oil in the still is vaporized and distilled over through the vapor line 18. The undistilled residuum may be drawn off continuously or periodically through the connection at 15 and through the residuum exchanger 16, exchanging heat with the charge entering through the line 35a and passing out through the line 40. The cooled residuum then flows from the exchanger 16 to a storage receptacle 17.

The vapors evolved from the still 14, passing through the vapor line 18, enter the fractionating tower 19a at the lower portion thereof and pass upward, during which passage they are subjected to fractionation or rectification and a portion of the vapors is condensed. The condensate collects in the lower portion of the tower and is withdrawn through the line 21a to storage 22a, constituting a heavy cut or fraction of the distillate which may correspond to a product such as gas oil.

The vapors passing upward through the tower 19a are cooled by the charge passing through the coils 30a, 31a, and 32a, and this cooling may serve the purpose of supplying reflux to the tower, although additional reflux cooling may be supplied from an extraneous source if so desired. The fractionated vapors evolved from the top of the tower 19a pass through the vapor line 20a, to the lower portion of the tower 19b. The operation of the tower 19b is substantially the same as that of the tower 19a, the vapors passing upward through the tower and being subjected to fractionation therein. The charge passing through the coils 30b, 31b, and 32b, supply reflux cooling to the tower which may be augmented by suitable cooling supplied from an extraneous source if so desired. The condensate collected in the bottom of the tower 19b is withdrawn through the line 21b to storage 22b to constitute an intermediate fraction or cut from the crude charge which may be of the nature of a kerosene burning oil. The vapors from the top of the tower 19b pass through the vapor line 20b to the vapor heat exchanger 23 wherein they give up a portion of their heat to the incoming charge. The vapors then pass through the line 24 to the condenser 25 where they are condensed and flow through the line 26 to a storage receptacle 27. The overhead vapors from the tower 19b may be considered as the light fraction or cut from the crude charge and may be of the nature of naphtha or gasoline.

Returning to a consideration of the crude charge, it has been mentioned that, in its flow through the vapor heat exchanger 23, the charge absorbs heat from the vapors evolved from the fractionating tower 19b. The charge is further heated in its passage through the coils 30b, 31b, and 32b, usually to such a degree that when discharged into the vapor trap 34b a substantial quantity may be vaporized. In the vapor trap 34b the float 39b operates the valves 36b and 38b so as to maintain a constant liquid level therein and to discharge the vaporized portion of the charge into the tower 19b at an intermediate point, while allowing the continuous flow of the unvaporized charge through the line 35b. The operation of the vapor trap 34a is substantially the same as that of 34b. In this case the charge from the line 35d is heated while flowing through the coils 30a, 31a, and 32a, so that when introduced into the vapor trap 34a a further portion is vaporized. The float 39a operates the valves 36a and 38a to discharge the vaporized portion of the charge into the tower 19a at an intermediate point while the unvaporized portion of the charge is discharged through the line 35a to the residuum exchanger 16 where it absorbs further heat from the undistilled residuum withdrawn from the still 14. From the residuum exchanger 16 the heated charge flows through the line 40 to the hot-oil pump 41 from which it is forced through the heating coil 12, as described in a previous paragraph.

Although the invention has been described in connection with the distillation of a typical crude petroleum under ordinary atmospheric pressure, it will be understood that it is equally applicable to any type of charging stock containing an appreciable proportion of more volatile constituents and is also applicable to cracking operations carried on under superatmospheric pressures.

Obviously many modifications and variations of the invention, as hereinbefore set forth, may be made without departing from the spirit and scope thereof, and therefore, only such limitations should be imposed as are indicated in the appended claims.

What I claim is:

1. The process of distilling hydrocarbon oil which comprises maintaining a body of oil in a still forming a portion of a distillation unit, maintaining the still under conditions of distillation, passing vapors evolved from the still through a fractionating tower, heating the oil charge by exchange of heat from the vapors passing through said fractionating tower but not in direct contact therewith, separating the vapors evolved from the oil charge thus heated and introducing them into the fractionating tower at an intermediate point, and heating the remaining unvaporized portion of the charge to a vaporizing temperature before it is introduced into the still.

2. Apparatus for distilling hydrocarbon oil comprising a vaporizing chamber, means for conducting evolved vapors from the vaporizing chamber to a fractionating tower, means associated with said fractionating tower adapted to bring fresh charging stock into indirect heat exchange with vapors from the vaporizing chamber, means for separating out and removing vapors evolved from the charging stock, means for introducing said vapors into the fractionating tower at an intermediate point, means for applying additional heat to the unvaporized charging stock, and means for passing the heated charging stock thence into the vaporizing chamber.

OTTO BEHIMER.